(12) United States Patent
Zhu et al.

(10) Patent No.: US 12,440,509 B2
(45) Date of Patent: Oct. 14, 2025

(54) APPLICATION OF SULFATED POLYSACCHARIDES IN RESISTING NOVEL CORONAVIRUS

(71) Applicant: Dalian Polytechnic University, Dalian (CN)

(72) Inventors: Beiwei Zhu, Dalian (CN); Shuang Song, Dalian (CN); Xiuping Dong, Dalian (CN); Chengrong Wen, Dalian (CN); Chunqing Ai, Dalian (CN); Dayong Zhou, Dalian (CN); Hang Qi, Dalian (CN); Libo Qi, Dalian (CN); Dongmei Li, Dalian (CN); Jingfeng Yang, Dalian (CN)

(73) Assignee: Dalian Polytechnic University, Dalian (CN)

( * ) Notice: Subject to any disclaimer, the term of this patent is extended or adjusted under 35 U.S.C. 154(b) by 956 days.

(21) Appl. No.: 17/567,945

(22) Filed: Jan. 4, 2022

(65) Prior Publication Data

US 2022/0125827 A1  Apr. 28, 2022

Related U.S. Application Data

(63) Continuation of application No. PCT/CN2020/112597, filed on Aug. 31, 2020.

(30) Foreign Application Priority Data

| Jun. 18, 2020 | (CN) | 202010560842.8 |
| Jun. 18, 2020 | (CN) | 202010561812.9 |
| Jun. 18, 2020 | (CN) | 202010561815.2 |

(51) Int. Cl.
| A61K 31/737 | (2006.01) |
| A23L 29/256 | (2016.01) |
| A61K 9/00 | (2006.01) |
| A61K 31/731 | (2006.01) |
| A61P 11/00 | (2006.01) |
| A61P 31/14 | (2006.01) |
| B01D 46/00 | (2022.01) |

(52) U.S. Cl.
CPC .......... *A61K 31/737* (2013.01); *A23L 29/256* (2016.08); *A61K 9/0073* (2013.01); *A61K 31/731* (2013.01); *A61P 11/00* (2018.01); *A61P 31/14* (2018.01); *B01D 46/00* (2013.01)

(58) Field of Classification Search
None
See application file for complete search history.

(56) References Cited

U.S. PATENT DOCUMENTS

| 2004/0202632 A1* | 10/2004 | Gott | A61K 8/732 |
| | | | 424/70.13 |
| 2011/0224229 A1* | 9/2011 | Lindsjo | A61P 1/04 |
| | | | 544/405 |

FOREIGN PATENT DOCUMENTS

| CN | 101099714 A | * | 1/2008 |
| CN | 101784272 A | | 7/2010 |
| CN | 107847430 A | | 3/2018 |
| CN | 111471088 A | | 7/2020 |
| CN | 111588732 A | | 8/2020 |

OTHER PUBLICATIONS

Song, S., Peng, H., Wang, Q., Liu, Z., Dong, X., Wen, C., . . . & Zhu, B. (2020). Inhibitory activities of marine sulfated polysaccharides against SARS-CoV-2. Food & Function, 11(9), 7415-7420. (Year: 2020).*
Huang, N., Wu, M. Y., Zheng, C. B., Zhu, L., Zhao, J. H., & Zheng, Y. T. (2013). The depolymerized fucosylated chondroitin sulfate from sea cucumber potently inhibits HIV replication via interfering with virus entry. Carbohydrate research, 380, 64-69. (Year: 2013).*
Zhu, Z., Zhu, B., Sun, Y., Ai, C., Wu, S., Wang, L., . . . & Liu, X. (2018). Sulfated polysaccharide from sea cucumber modulates the gut microbiota and its metabolites in normal mice. International journal of biological macromolecules, 120, 502-512. (Year: 2018).*
Tandon Ritesh et. al "Effective Inhibition of SARS-CoV-2 Entry by Heparin and Enoxaparin Derivatives ", bioRxiv Jun. 8, 2020.
Pereira Leonel et.al., "The COVID 19 novel coronavirus pandemic 2020: seaweeds to the rescue Why does substantial supporting research about the antiviral properties of seaweed polysaccharides seem to go unrecognized by the pharmaceutical community in these desperate times ", Journal of Applied Phycology Jun. 1, 2020.

\* cited by examiner

*Primary Examiner* — Dale R Miller
(74) *Attorney, Agent, or Firm* — IPro, PLLC; Na Xu

(57) ABSTRACT

The disclosure provides application of sulfated polysaccharides in resisting novel coronavirus, belonging to the technical field of biomedicine. It is confirmed in the disclosure that by binding to an S protein on the surface of the SARS-CoV-2 virus, the sea cucumber polysaccharides, fucoidans or carrageenans can prevent cell membranes of body cells from adsorbing and internalizing the SARS-CoV-2 virus, thereby preventing the SARS-CoV-2 virus from infecting the body cells, which indicates that the sea cucumber polysaccharides, fucoidans or carrageenans have the effect of prevention and treatment of pneumonia caused by the novel coronavirus. These polysaccharides can be used to prepare protective articles having functions of prevention and treatment of novel coronavirus infection, for example: inhalations, hand lotions, oral liquids and respirators.

6 Claims, 5 Drawing Sheets

APPLICATION OF SULFATED POLYSACCHARIDES IN RESISTING NOVEL CORONAVIRUS

TECHNICAL FIELD

The disclosure relates to application of sulfated polysaccharides in resisting novel coronavirus, in particular to application of sea cucumber polysaccharides, fucoidans or carrageenans in resisting novel coronavirus, belonging to the technical field of biomedicine.

BACKGROUND

The novel coronavirus (2019-nCoV), officially classified and named as severe acute respiratory syndrome coronavirus 2 (SARS-CoV-2) and referred to as the novel coronavirus, began to appear at the end of 2019. It has spread rapidly around the world and has infected millions of people. Common signs of people infected with coronavirus include respiratory symptoms, fever, cough, shortness of breath and dyspnea. In severe cases, the infection can result in pneumonia, severe acute respiratory syndrome, renal failure and even death.

After the novel coronavirus enters the body through the skin and mucosa, it binds to the angiotensin converting enzyme 2 (ACE2 for short) receptor on cells through the spike protein (S protein for short) on the surface of the virus, and then the cell membrane will adsorb and internalize the virus. After the viral entry into the cytoplasm, uncoating and genome release take place. After the genome is released into the cytoplasm, the viral RNA binds to the ribosome of the host cell, and two set of proteins are obtained by translation. Then, the protease splits the two sets of proteins to generate enzymes and proteins for continued assembly and replication of the virus. The newly generated enzymes include RNA-dependent RNA polymerase (RdRp), whose role is to form a new viral RNA by replication. The new viral RNA will bind to the protein produced by the protease and assemble to form the new virus, which is released from the original host cell and continues to infect other cells.

According to the infection mechanism of the novel coronavirus, the research and development of anti-novel coronavirus medications mainly start from two aspects. One is to prevent the virus from binding to the host cell, with the S protein or ACE2 as the target. The other is to prevent the production of the new virus in the host cell, with the RdRp or protease as the target.

Sea cucumber polysaccharides are a category of important nutrients of the sea cucumber body wall, and can account for 6% or more of the total organic matters of the dried sea cucumber. The sea cucumber polysaccharides are composed of sea cucumber sulfated fucan and sea cucumber fucosylated chondroitin sulfate. The sea cucumber sulfated fucan is a sulfated polysaccharide formed by polymerization of L-fucose. The sea cucumber fucosylated chondroitin sulfate is a sulfated polysaccharide whose main chain structure consists of glucuronic acid-acetylgalactosamine repeating units with fucosyl branched chains. The sea cucumber polysaccharides have a plurality of functions including enhancing immunity, lowering blood lipids, reducing weight and improving intestinal flora.

Fucoidans, also known as fucoidan sulfate, fucoidin and sulfated fucoidan and derived primarily from brown algae, are a category of polysaccharides containing fucose and sulfate group. Besides, they may also contain other monosaccharides (mannose, galactose, glucose, uronic acid, etc.). The fucoidans have a plurality of functions including removing *Helicobacter pylori*, lowering blood lipids, reducing weight and improving intestinal flora.

Carrageenans, also known as carrageenins, Eucheuma *spinosum* gum and Irish moss gelose, are sulfated galactans whose backbone structure is formed by alternately linking 1,3-β-D-galactose and 1,4-α-D-galactose. According to different positions where the half ester sulfate group is linked to the galactose (that is, different compositions and structures), carrageenans can be classified into seven types: κ-carrageenan, τ-carrageenan, λ-carrageenan, μ-carrageenan, ν-carrageenan, θ-carrageenan and ξ-carrageenan. Among them, the first three are mainly produced and used in industry. Owing to their functional characteristics, the carrageenans are used as a thickener, a gelatinizer, a suspending agent, an emulsifier, a stabilizer and the like in the industrial fields such as food and daily chemicals. In addition, some studies have found that the carrageenans have a plurality of physiological activities, including anticoagulation, blood lipid lowering, immunomodulation, gastric ulcer resisting and rheumatoid arthritis resisting.

SUMMARY

The disclosure provides use of sea cucumber polysaccharides in resisting novel coronavirus (severe acute respiratory syndrome coronavirus 2, SARS-CoV-2 or 2019-nCoV). The resisting novel coronavirus refers to prevention or treatment of pneumonia caused by the novel coronavirus, including binding to an S protein on the surface of the SARS-CoV-2 virus to prevent the SARS-CoV-2 virus from invading body cells. The use of the sea cucumber polysaccharides can be employed to prepare medications, food and daily chemical products for prevention or treatment of coronavirus infection.

A preparation method of the sea cucumber polysaccharides includes: carrying out cleaning, boiling, draining, dicing and freeze-drying on sea cucumbers, soaking the freeze-dried sample in 4° C. acetone for 24 h, air-drying the freeze-dried sample at room temperature, adding 30 mL of 0.1 mol/L sodium acetate buffer solution with pH 6.0, 100 mg of papain with specific enzyme activity of 2 units/mg, 48 mg of ethylenedinitrilotetraacetic acid and 18 mg of cysteine to 1 g of the freeze-dried sample, vortex-mixing the mixture, shaking the mixture in a 60° C. water bath to carry out enzymatic hydrolysis for 24 h, centrifuging the reaction mixture, and taking the supernatant; adding 1.6 mL of 10% cetylpyridinium chloride solution to the supernatant, allowing the mixture to stand at room temperature for 24 h, centrifuging the mixture, and taking the precipitate; dissolving the precipitate in 15 mL of 3 mol/L NaCl-ethanol solution, adding 30 mL of 95% ethanol solution, allowing the mixture to stand at 4° C. for 24 h, centrifuging the mixture, and taking the precipitate; and washing the precipitate with 80% ethanol 2 to 3 times, washing the precipitate with 95% ethanol 2 to 3 times, air-drying the precipitate at room temperature, dissolving the precipitate in distilled water, desalting the mixture with a dialysis bag, and freeze-drying the product to obtain the sea cucumber polysaccharides.

The sea cucumber polysaccharides are derived from sea cucumbers, including sea cucumber species of Aspidochirotida: Holothuriidae, Aspidochirotida: Stichopodidae, Molpadida: Caudinidae and Dendrochirotida: Cucumariidae, and composed of sea cucumber sulfated fucan and sea cucumber fucosylated chondroitin sulfate. The sea cucumber sulfated fucan is a sulfated polysaccharide formed by polymerization of L-fucose. The sea cucumber fucosylated chondroitin sulfate is a sulfated polysaccharide whose main chain structure consists of glucuronic acid-acetylgalactosamine repeating units with fucosyl branched chains.

The disclosure provides use of sea cucumber polysaccharides in preparation of a medication for prevention or treatment of coronavirus infection. The medication takes the sea cucumber polysaccharides as an active ingredient for inhibiting entry of the coronavirus into body cells.

The medication further includes pharmaceutically acceptable adjuvants, including: solvents, propellants, solubilizers, cosolvents, emulsifiers, colorants, binders, disintegrants, fillers, lubricants, wetting agents, osmotic pressure regulators, stabilizers, glidants, flavoring agents, preservatives, suspending agents, coating materials, fragrances, anti-adherents, integrating agents, penetration enhancers, pH regulators, buffers, plasticizers, surfactants, foaming agents, defoamers, thickeners, inclusion agents, humectants, adsorbents, diluents, flocculants and deflocculants, filter aids and release retardants.

Dosage forms of the medication may include: sprays, aerosols, powder aerosols, lotions, ointments, liniments, nasal sprays, effervescent tablets, gargles, powders, emulsions, suspensions and solutions.

The disclosure provides use of sea cucumber polysaccharides in preparation of protective articles for protecting against coronavirus infection. The protective articles include: hand lotions, hand sanitizers and mouthwashes. During the preparation of the protective articles, the sea cucumber polysaccharides are added.

The disclosure provides a preparation method of an inhalation for prevention of coronavirus infection. In a sterile environment, 30-50 g of sodium chloride, 70-120 g of citric acid, 70-120 g of sodium citrate and 0.5-2 g of benzalkonium chloride are respectively dissolved in 8-50 times the amount of purified water by stirring; 5-20 g of sea cucumber polysaccharide is dissolved in 500 mL of purified water by stirring; and the above solutions are combined and diluted with purified water to 5-20 L, the mixture is filtered through a 0.5-micron filter membrane, and the filtrate is canned.

The disclosure provides a preparation method of an oral liquid for prevention of coronavirus infection. 1-2 kg of wolfberry and 1-2 kg of longan are boiled in 12-20 L of water and held with low fire for 0.5-3 h, the mixture is filtered, the filtrate is taken and concentrated to 8-15 L, 40-100 g of sea cucumber polysaccharide, 8-16 g of pectin and 500-1000 g of honey are added, and the mixture is stirred uniformly, naturally cooled and allowed to stand for 2-6 h to make the precipitation complete; and the filtrate is taken by pressure filtration, 500-1500 g of white sugar, 35-80 g of citric acid, 3-10 g of table salt and 15-60 g of vitamin C are added and mixed uniformly, pressure filtration is carried out with diatomite, filtration is carried out through two stages of microporous filter membranes with pore sizes of 5 microns and 0.5 micron, and the filtrate is pasteurized (70-90° C., 20-50 min) and canned.

The disclosure provides a preparation method of a hand lotion for prevention of coronavirus infection. The formulation of the hand lotion includes the following components in parts by mass: oil phase: 3-6 parts of stearic acid, 1-4 parts of glycerol monostearate, 1-5 parts of isopropyl palmitate, 1-4 parts of petrolatum, 5-10 parts of white mineral oil, 1-4 parts of cetyl alcohol, 0.1-0.5 part of fragrance, 0.1-0.4 part of methyl paraben and 0.1-0.4 part of propyl paraben; and water phase: 5-10 parts of glycerin, 0.1-0.5 part of allantoin, 0.1-0.4 of part of dimethyl p-chlorophenol, 0.5-1 part of triethanolamine, 0.05-0.5 part of sea cucumber polysaccharide and 65-75 parts of water.

The oil phase (stearic acid, glycerol monostearate, isopropyl palmitate, petrolatum, white mineral oil, cetyl alcohol, methyl paraben and propyl paraben) is dissolved by heating and stirring; the sea cucumber polysaccharide or fucoidan is dissolved in water, and the glycerin and the triethanolamine are added and dissolved by heating and stirring; then the water phase is slowly poured into the oil phase with vigorous stirring; after the mixture is treated with a homogenizer, heating and stirring are started, the allantoin, the dimethyl p-chlorophenol and the fragrance are added when the mixture is cooled to 45-55° C., the stirring is continued, and the product is discharged when being cooled to 25-35° C.; and the product is placed for 2-3 days after which no changes occur, and is packaged after passing the inspection.

According to the disclosure, it is confirmed by experiment that the sea cucumber polysaccharides at a concentration of 3.9 μg/mL and above can significantly inhibit the SARS-CoV-2 virus from infecting body cells. By binding to the S protein on the surface of the SARS-CoV-2 virus, the sea cucumber polysaccharides can prevent cell membranes of the body cells from adsorbing and internalizing the SARS-CoV-2 virus, thereby preventing the SARS-CoV-2 virus from infecting the body cells, which indicates that the sea cucumber polysaccharides have the anti-novel coronavirus effect.

When being externally applied, the sea cucumber polysaccharides have a moisturizing effect. When being orally administered, the sea cucumber polysaccharides have the effects including enhancing immunity, lowering blood sugar, lowering blood lipids, reducing weight and improving intestinal flora. It can be seen that both the external application and the oral administration of the sea cucumber polysaccharides are beneficial and harmless to the human body. Therefore, the sea cucumber polysaccharides can be used to prepare the inhalation (nasal spray) that enters the nasal cavity, trachea, and lungs to prevent the virus from infecting body tissues and to prevent and treat the novel coronavirus. When being added to the formulation of the hand lotion, the sea cucumber polysaccharides can increase the anti-novel coronavirus effect of the hand lotion and prevent the novel coronavirus infection. The oral liquid prepared from the sea cucumber polysaccharides can inhibit the SARS-CoV-2 virus from invasion from the digestive system, has the function of prevention and adjuvant treatment of pneumonia caused by the novel coronavirus, and also has the functions including enhancing immunity, removing *H. pylori*, lowering blood sugar, lowering blood lipids, reducing weight and improving intestinal flora.

The sea cucumber polysaccharides are derived from food and are non-toxic, and have no toxic or side effects when being used in prevention and treatment of the novel coronavirus.

DETAILED DESCRIPTION

Figure 1:
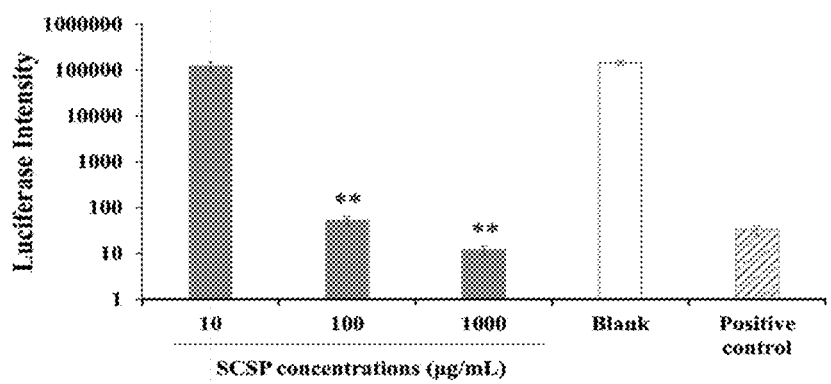
FIG. 1 shows the inhibitory effect of sea cucumber polysaccharide (SCSP) on the pseudovirus with S protein. The blank is a blank medium, and the positive control is EK1 peptide. *$p<0.05$, **$p<0.01$.

Example 1 Method for Preparing Sea Cucumber Polysaccharides (1) The preparation method of the sea cucumber polysaccharides (SCSP) included:

Sea cucumbers (*Stichopus japonicus*) were cleaned, boiled, drained, diced and freeze-dried. The freeze-dried sample was soaked in 4° C. acetone for 24 h, and air-dried at room temperature. To 1 g of the freeze-dried sample, as an example, 30 mL of 0.1 mol/L sodium acetate buffer solution (pH 6.0), 100 mg of papain (with specific enzyme activity of 2 units/mg), 48 mg of ethylenedinitrilotetraacetic acid and 18 mg of cysteine were added, the mixture was vortex-mixed and shaken in a 60° C. water bath to carry out enzymatic hydrolysis for 24 h, the reaction mixture was centrifuged (6000 g, 15 min, room temperature), and the supernatant was taken. 1.6 mL of 10% cetylpyridinium chloride solution was added to the supernatant, the mixture was allowed to stand at room temperature for 24 h and centrifuged (8000 g, 15 min, room temperature), and the precipitate was taken. The precipitate was dissolved in 15 mL of 3 mol/L NaCl-ethanol (100:15 v/v) solution, 30 mL of 95% ethanol solution was added, the mixture was allowed to stand at 4° C. for 24 h and centrifuged (8000 g, 15 min, room temperature), and the precipitate was taken. The precipitate was washed with 10 mL of 80% ethanol 2 to 3 times, washed with 10 mL of 95% ethanol 2 to 3 times, air-dried at room temperature and dissolved in distilled water, the mixture was desalted with a dialysis bag (3500 Da), and the product was freeze-dried to obtain the sea cucumber polysaccharides.

This example may further include pretreatment steps such as preparation of solutions and preparation of ultrapure water.

(2) Determination of structural characteristics and composition of sea cucumber polysaccharides prepared in the step above The structural characteristics and purity of the sea cucumber polysaccharides were detected using $^1$H NMR.

The molecular weight of the sea cucumber polysaccharides was detected using gel permeation chromatography.

The sulfate radical content of the sea cucumber polysaccharides was detected using a gelatin turbidimetric method.

The monosaccharide composition in the sea cucumber polysaccharides was detected using high performance liquid chromatography+PMP derivatization.

Functional groups of the sea cucumber polysaccharides were detected using Fourier transform infrared spectroscopy.

The uronic acid content was determined using an m-hydroxybiphenyl method.

The results showed that the sea cucumber polysaccharides contained sulfated fucan and fucosylated chondroitin sulfate, the molecular weight of the sulfated fucan was >670 kDa, and the molecular weight of the fucosylated chondroitin sulfate was 179 kDa. The sulfate radical content was 25.8±2.4%. The main monosaccharides were glucosamine (GlcN), galactosamine (GalN), glucose (Glc), galactose (Gal) and fucose (Fuc) in a mole ratio of 1.0:1.7:1.1:1.8:16.0. The uronic acid content was 16.5±0.5%.

Example 2 Evaluation of Anti-Novel Coronavirus Effect of Sea Cucumber Polysaccharides Using Pseudovirus Model The full-length sequence of the gene encoding the HCoV-19 spike protein was cloned into a pCAGGS vector for production of the pseudovirus, and the constructed recombinant vector was called pCAGGS-HCoV-19-S. The successful construction of pCAGGS-HCoV-19-S was confirmed by DNA sequencing. The pCAGGS-HCoV-19-S and pNL4-3 plasmids were co-transfected into HEK 293T cells. After 48 h of culture, the supernatant containing the SARS-CoV-2 pseudovirus was collected, and the 50% tissue culture infectious dose (TCID50) of the pseudovirus was determined by infected Huh7 cells.

The anti-novel coronavirus effect of the sea cucumber polysaccharides was evaluated using the SARS-CoV-2 pseudovirus model. The specific steps were as follows:

(1) Huh7 cells in good growth condition were selected, trypsinized, spread on a 96-cell plate and cultured overnight until the cells reached 80-100% in 18-24 h.

(2) 100 TCID$_{50}$ pseudovirus per well was mixed with a serum-free medium containing the sea cucumber polysaccharides prepared in Example 1. The final concentrations of the sea cucumber polysaccharides after mixing were 0.01 mg/mL, 0.1 mg/mL and 1 mg/mL. The mixture was incubated at 37° C. for 30 min. The EK1 peptide was used as the positive control, and a blank serum-free medium was used as the negative control.

(3) After the Huh7 cells were washed with PBS to remove the serum, the mixture of the virus and the sea cucumber polysaccharides was diluted 3-fold and infected the Huh7 cells, 100 μL per well, three parallel wells for each sample. After 4-6 h, 100 μL of the medium containing 5% FBS serum was added.

(4) After 48 h, the luciferase intensity was determined, with reference to Promega's Luciferase Assay System Protocol or Dual Luciferase Reporter Assay System Protocol. The specific operations were as follows: The 96-well plate was inverted and washed with PBS 2 times, and the PBS was blotted, followed by the addition of 30 μL of lysis buffer. After the cells were lysed at room temperature for 30 min, 10 μL of the product was sucked and placed on a whiteboard. With 50 μL of substrate, the luciferase intensity was determined. The results are shown in FIG. 1.

The results showed that when the final concentration of the sea cucumber polysaccharides was 100 μg/mL and 1000 μg/mL, the SARS-CoV-2 virus could be effectively inhibited from entering the cells. Moreover, as the model used was the SARS-CoV-2 pseudovirus with S protein, it could be concluded that the target of the sea cucumber polysaccharides was the S protein.

Example 3 Effect of Sea Cucumber Polysaccharides on SARS-CoV-2 Live Virus

Figure 2:
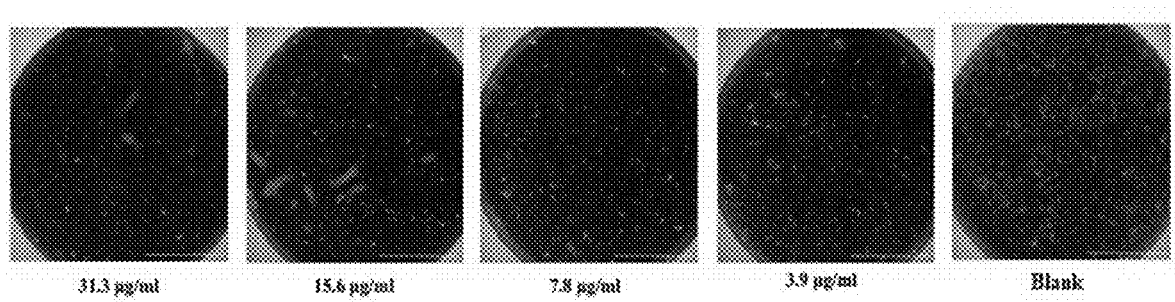
FIG. 2 shows cell immunofluorescence images after the SARS-CoV-2 virus is mixed with different concentrations of sea cucumber polysaccharide. The final concentrations of the sea cucumber polysaccharide are 31.3 µg/mL, 15.6 µg/mL, 7.8 µg/mL and 3.9 µg/mL. The negative control is a blank medium.
Figure 3:
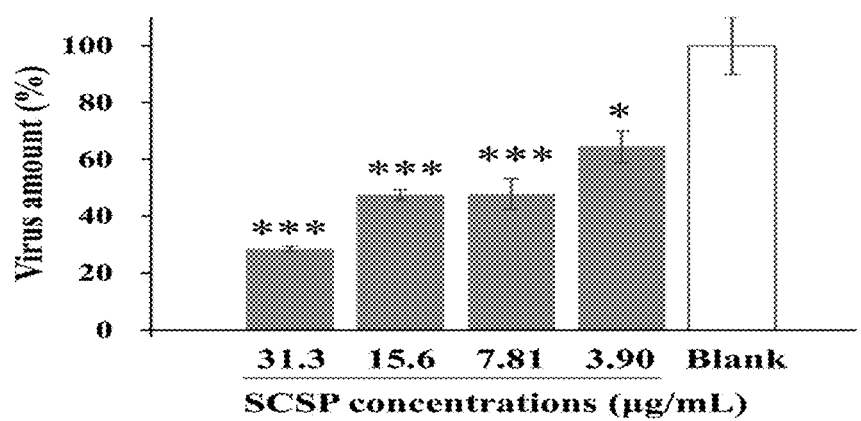
FIG. 3 shows the inhibitory effect of sea cucumber polysaccharide (SCSP) on the SARS-CoV-2 virus. The final concentrations of the sea cucumber polysaccharide are 31.3 µg/mL, 15.6 µg/mL, 7.8 µg/mL and 3.9 µg/mL. The blank is a blank medium. *$p<0.05$, $p<0.01$, $p<0.001$.
Figure 4:
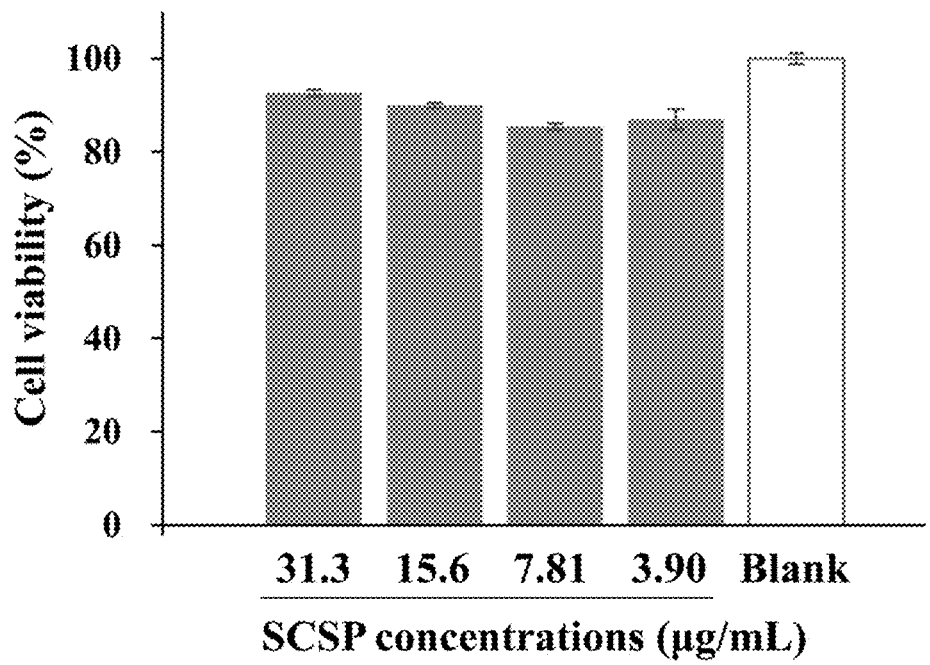
FIG. 4 shows the influence of sea cucumber polysaccharide (SCSP) on the viability of Vero E6 cells. The final concentrations of the sea cucumber polysaccharide are 31.3 µg/mL, 15.6 µg/mL, 7.8 µg/mL and 3.9 µg/mL. The blank is a blank medium. *$p<0.05$, $p<0.01$, $p<0.001$.
Figure 5:
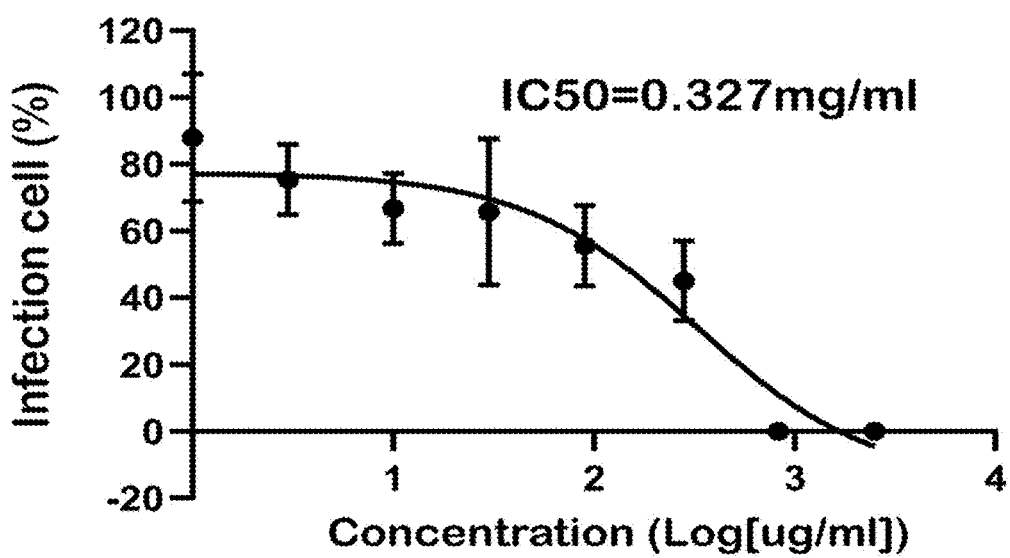
FIG. 5 shows the inhibitory effect of different concentrations of *Ascophyllum nodosum* polysaccharide on the novel coronavirus. *Abscissa*: concentration of *A. nodosum* polysaccharide, and ordinate: infecting cell rate (%)=amount of viruses entering cells/total amount of viruses×100.
Figure 6:
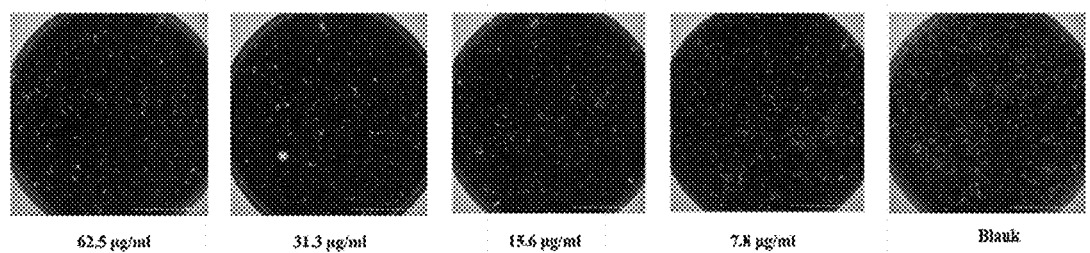
FIG. 6 shows cell immunofluorescence images after the SARS-CoV-2 virus is mixed with different concentrations of fucoidan. The concentrations of the fucoidan are 62.5 µg/mL, 31.3 µg/mL, 15.6 µg/mL and 7.8 µg/mL. The negative control is a blank medium.
Figure 7:
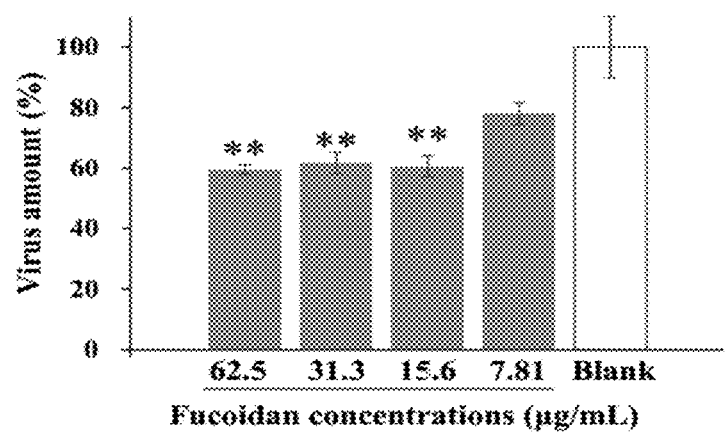
FIG. 7 shows the inhibitory effect of fucoidan on the SARS-CoV-2 virus. The final concentrations of the fucoidan are 62.5 µg/mL, 31.3 µg/mL, 15.6 µg/mL and 7.8 µg/mL. The blank is a blank medium. *$p<0.05$, $p<0.01$, $p<0.001$.
Figure 8:
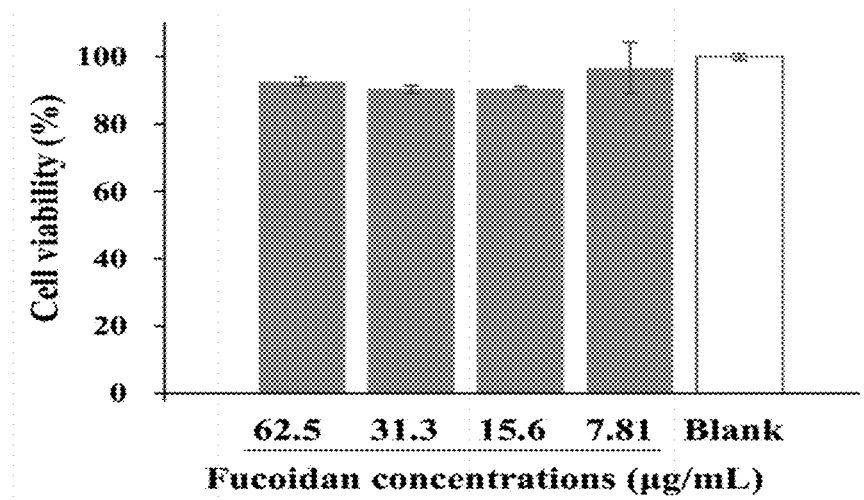
FIG. 8 shows the influence of fucoidan on the viability of Vero E6 cells. The final concentrations of the fucoidan are 62.5 µg/mL, 31.3 µg/mL, 15.6 µg/mL and 7.8 µg/mL. The blank is a blank medium. *$p<0.05$, $p<0.01$, $p<0.001$.

The SARS-CoV-2 live virus (from Second Military Medical University) and the sea cucumber polysaccharides (SCSP) prepared in Example 1 were uniformly mixed with a DMEM medium containing 5% fetal calf serum such that the final concentrations of the sea cucumber polysaccharides were 31.3 μg/mL, 15.6 μg/mL, 7.8 μg/mL and 3.9 μg/mL. The mixture was allowed to stand at 37° C. for 1 h, added to a 96-well plate inoculated with Vero E6 cells 12 h in advance (the original cell culture fluid was blotted before the addition), and cultured for 24 h. Then, the viral protein was detected using immunofluorescence. DAPI was used to stain the nucleus. The inhibitory effect of the sea cucumber polysaccharides with a concentration gradient of 31.3 μg/mL, 15.6 μg/mL, 7.8 μg/mL and 3.9 μg/mL on the virus was observed using immunofluorescence microscopy. The results are shown in FIG. 2. Statistics on the quantitative results of the virus (green fluorescence) were made using SPSS software Tukey HSD, as shown in FIG. 3. Within the concentration range of greater than 3.9 μg/mL, the sea cucumber polysaccharides could significantly inhibit the novel coronavirus from infecting the cells. Meanwhile, statistics on the quantitative results of the nucleus (blue fluorescence) were also made using the SPSS software Tukey HSD, as shown in FIG. 4. At the concentrations of 31.3 μg/mL, 15.6 μg/mL, 7.8 μg/mL and 3.9 μg/mL, the sea cucumber polysaccharides showed no cytotoxicity.

Example 4 Preparation of Ascophyllum Nodosum (Brown Algae) Fucoidan (1) A preparation method of the *A. nodosum* fucoidan included:

S1. *A. nodosum* was cleaned, drained, air-dried, pulverized and passed through an 80-mesh sieve, thereby obtaining *A. nodosum* powder A;

S2. The *A. nodosum* powder A in step S1 was soaked in 25° C. anhydrous ethanol for 4 h. After filtration with gauze, a precipitate A was taken. The precipitate A was placed in 25° C. anhydrous ethanol and stirred for 4 h. After filtration with gauze, a precipitate B was taken. The precipitate B was placed in 25° C. anhydrous ethanol and soaked for 4 h. After filtration with gauze, a precipitate C was taken, and air-dried at room temperature to remove lipids and small lipid-soluble molecules, thereby obtaining *A. nodosum* powder B. A weight-to-volume ratio of the *A. nodosum* powder A and the precipitate B each to the anhydrous ethanol in this step was 1:4 g/mL.

S3. The *A. nodosum* powder B in step S2 was taken, followed by the addition of a disodium hydrogen phosphate-citric acid buffer (pH=5), cellulase, pectinase and papain. The mixture was uniformly stirred and mixed. The mixture was shaken in a 50° C. water bath to carry out enzymatic hydrolysis for 4 h to cleave the fucoidan. The reaction mixture was heated to 98° C., and held for 10 min to inactivate the enzymes. The obtained mixture was centrifuged at 4500 r/min for 15 min, and the supernatant was taken. A weight-to-volume ratio of the *A. nodosum* powder B to the disodium hydrogen phosphate-citric acid buffer was 1:30 g/mL. A weight ratio of the *A. nodosum* powder B to the cellulase (with specific enzyme activity of 100 units/mg) to the pectinase (with specific enzyme activity of 50 units/mg) to the papain (with specific enzyme activity of 2 units/mg) was 12500:42:6:6.

S4. An excess of CaCl$_2$ was added to the supernatant in step S3 with stirring, the mixture was centrifuged at 4500 r/min at room temperature for 15 min to remove algin, and the supernatant was taken. A volume-to-weight ratio of the supernatant in step S3 to the CaCl$_2$ was 20:1 mL/g.

S5. Cetyltrimethylammonium bromide (CTAB) was added to the supernatant in step S4 to precipitate fucoidan, the obtained mixture was centrifuged at 4500 r/min at room temperature for 15 min, and the precipitate was collected and dissolved in a 3 mol/L CaCl$_2$ solution, followed by the addition of anhydrous ethanol. The mixture was allowed to stand at 4° C. for 24 h to precipitate the fucoidan. The obtained mixture was centrifuged at 4500 r/min at 4° C. for 15 min, and the precipitate was collected. A volume-to-weight ratio of the supernatant in step S4 to the CTAB was 50:1 mL/g. A weight-to-volume ratio of the precipitate to the 3 mol/L CaCl$_2$ solution was 1:3 g/mL. A volume ratio of the CaCl$_2$ solution to the anhydrous ethanol was 2:3.

S6. The precipitate in step S5 was washed with 80% (volume fraction) ethanol 3 times, washed with 95% (volume fraction) ethanol 3 times, air-dried at room temperature, and dissolved in ultrapure water. The mixture was dialyzed with a dialysis bag having a molecular weight of 3500 Da for 24 h by using running tap water, and dialyzed for 48 h by using ultrapure water as a dialysis liquid such that calcium chloride and other salt ions contained in the fucoidan were removed. The dialysis liquid was replaced every 2 h. The product was freeze-dried for 72 h under the conditions of a vacuum of 1 pa and a temperature of −60° C. to obtain the *A. nodosum* fucoidan. A weight-to-volume ratio of the precipitate to the 80% (volume fraction) ethanol solution was 1:3 g/mL. A weight-to-volume ratio of the precipitate to the 95% (volume fraction) ethanol solution was 1:3 g/mL. A weight-to-volume ratio of the precipitate to the ultrapure water was 1:150 g/mL.

This example may further include pretreatment steps such as preparation of solutions and preparation of ultrapure water.

(2) Determination of structural characteristics and composition of *A. nodosum* fucoidan prepared in Example 1

The sulfate group content of the *A. nodosum* fucoidan was determined using a gelatin turbidimetric method.

The protein content of the *A. nodosum* fucoidan was determined using BCA assay.

The uronic acid content of the *A. nodosum* fucoidan was determined using an m-hydroxybiphenyl method.

The total saccharide content of the *A. nodosum* fucoidan was determined using a phenol-sulfuric acid method.

The molecular weight of the *A. nodosum* fucoidan was determined using gel permeation chromatography.

The monosaccharide composition in the *A. nodosum* fucoidan was determined using high performance liquid chromatography+PMP derivatization.

The functional groups of the *A. nodosum* fucoidan were determined using Fourier transform infrared spectroscopy.

The results showed that the molecular weight of the *A. nodosum* fucoidan was 490 kDa; the uronic acid content was 2.9-3.2%; the protein content was 3.8-4.0%; the sulfate group content was 28-30%; the total saccharide content was 54%; the monosaccharides in the brown algae fucoidan were fucose, mannose and galactose in a mole ratio of 6.5:1.1:1; and the functional groups included hydroxyl, carboxyl and sulfate groups.

Example 5 Verification of Use of *A. Nodosum* Fucoidan to Prevent SARS-CoV-2 Virus from Invading Body Cells The full-length sequence of the gene encoding the HCoV-19 spike protein was cloned into a pCAGGS vector for production of the pseudovirus, and the obtained recombinant vector was called pCAGGS-HCoV-19-S. The successful construction of pCAGGS-HCoV-19-S was confirmed by DNA sequencing. The pCAGGS-HCoV-19-S and pNL4-3 plasmids were co-transfected into HEK 293T cells. After 48 h of culture, the supernatant containing the SARS-CoV-2 pseudovirus model was collected, and the 50% tissue culture infectious dose ($TCID_{50}$) of the pseudovirus was determined by infected Huh7 cells.

The anti-novel coronavirus effect of the *A. nodosum* fucoidan was evaluated using the SARS-CoV-2 pseudovirus model. The specific steps were as follows:

(1) Huh7 cells in good growth condition were selected, trypsinized, spread on a 96-cell plate and cultured overnight until the cells reached 80-100% in 18-24 h.

(2) 100 TCID50 pseudovirus per well was mixed with a serum-free medium containing the *A. nodosum* fucoidan. The final concentrations of the *A. nodosum* fucoidan after mixing were 0.01 mg/mL, 0.1 mg/mL and 1 mg/mL. The mixture was incubated at 37° C. for 30 min. The EK1 peptide was used as the positive control, and a blank serum-free medium was used as the negative control.

(3) After the Huh7 cells were washed with PBS to remove the serum, the mixture of the virus and the *A. nodosum* fucoidan was diluted 3-fold and infected the Huh7 cells, 100 μL per well, three parallel wells for each sample. After 4-6 h, 100 μL of the medium containing 5% FBS serum was added.

(4) After 48 h, the luciferase intensity was determined, with reference to Promega's Luciferase Assay System Protocol or Dual Luciferase Reporter Assay System Protocol. The specific operations were as follows: The 96-well plate was inverted and washed with PBS 2 times, and the PBS was blotted, followed by the addition of 30 μL of lysis buffer. After the cells were lysed at room temperature for 30 min, 10 μL of the product was sucked and placed on a whiteboard. With 50 μL of substrate, the luciferase intensity was determined.

As shown in Table 1 below, when the final concentrations of the *A. nodosum* fucoidan were 0.01 mg/mL, 0.1 mg/mL and 1 mg/mL, the SARS-CoV-2 virus could be effectively inhibited from infecting the cells.

TABLE 1

| Sample Name No. | 0.01 mg/mL *A. nodosum* fucoidan | 0.1 mg/mL *A. nodosum* fucoidan | 1 mg/mL *A. nodosum* fucoidan | Negative control | Positive control |
|---|---|---|---|---|---|
| 1 | 36 | 79 | 20 | 142332 | 47 |
| 2 | 8 | 10 | 8 | 171709 | 36 |
| 3 | 664 | 8 | 7 | 113482 | 17 |
| Mean | 236 | 32 | 12 | 142508 | 33 |

Further, the same experimental method was used to detect the inhibitory effect of a plurality of concentrations of *A. nodosum* fucoidan on the novel coronavirus, and the IC50 value was calculated. The results are shown in FIG. 5. The IC50 of the *A. nodosum* fucoidan in inhibiting the novel coronavirus was 0.327 mg/mL.

Moreover, as the model used was the SARS-CoV-2 pseudovirus only with S protein, it could be concluded that the target of the *A. nodosum* fucoidan was the S protein.

Example 6 Analysis of Composition of Purchased Commercial Fucoidan and Verification of Anti-Novel Coronavirus Effect With reference to Fisheries Standard of People's Republic of China SC/T 3404-2012, it was determined that in the commercial fucoidan from Qingdao Bright Moon Seaweed Group Co., Ltd., the sulfate group content was 22.8±0.7%, the total saccharide content was 63.2±2.6%, and the fucose content was 36.9±3.8%. The uronic acid content determined by the m-hydroxybiphenyl method was 4.7±0.4%.

The SARS-CoV-2 live virus (from Second Military Medical University) and the fucoidan were uniformly mixed with a DMEM medium containing 5% fetal calf serum. The mixture was allowed to stand at 37° C. for 1 h, added to a 96-well plate inoculated with Vero E6 cells 12 h in advance (the original cell culture fluid was blotted before the addition), and cultured for 24 h. Then, the viral protein was detected using immunofluorescence. DAPI was used to stain the nucleus. The inhibitory effect of the fucoidan with the final concentrations of 62.5 μg/mL, 31.3 μg/mL, 15.6 μg/mL and 7.8 μg/mL on the virus was observed using immunofluorescence microscopy. The results are shown in FIG. 6. Statistics were made using SPSS software Tukey HSD, as shown in FIG. 7. When the concentration was greater than 15.6 μg/mL, the fucoidan could significantly inhibit the novel coronavirus from infecting the cells. Meanwhile, statistics on the quantitative results of the nucleus (blue fluorescence) were also made using the SPSS software Tukey HSD, as shown in FIG. 8. At the concentrations of 62.5 µg/mL, 31.3 µg/mL, 15.6 µg/mL and 7.8 µg/mL, the fucoidan showed no cytotoxicity.

Example 7 Analysis of Composition of Purchased Commercial t-Carrageenan and Verification of Anti-Novel Coronavirus Effect The monosaccharide composition of the t-carrageenan was determined using acid hydrolysis and high performance liquid chromatography after PMP derivatization. It was found that the main monosaccharides in the carrageenan were glucose and galactose in a ratio of 1.0:5.2. The sulfate group content determined by the gelatin turbidimetric method was 10.4±0.5%. The uronic acid content determined by the m-hydroxybiphenyl method was 0.9±0.1%.

Figure 9:
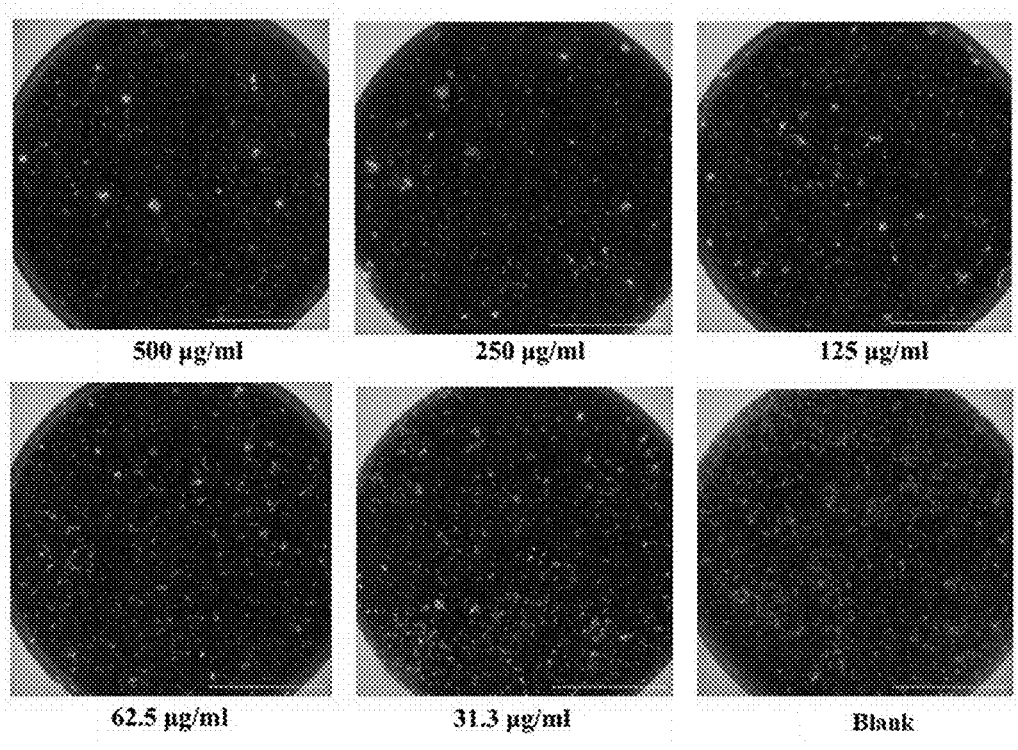
FIG. 9 shows cell immunofluorescence images after the SARS-CoV-2 virus is mixed with different concentrations of carrageenan. The concentrations of the carrageenan are 500 µg/mL, 250 µg/mL, 125 µg/mL, 62.5 µg/mL and 31.3 µg/mL. The negative control is a blank medium without t-carrageenan.
Figure 10:
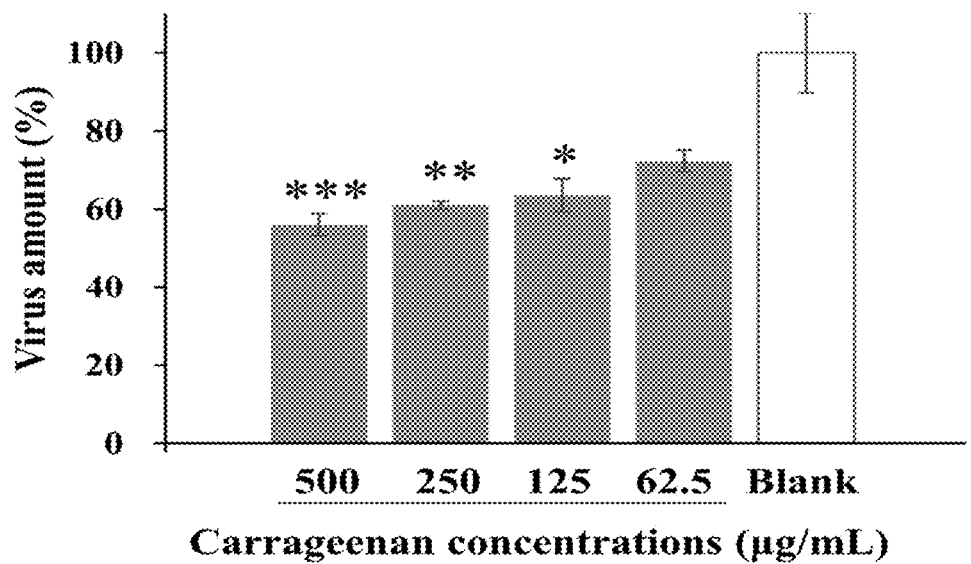
FIG. 10 shows the inhibitory effect of carrageenan on the SARS-CoV-2 virus. The final concentrations of carrageenan are 500 µg/mL, 250 µg/mL, 125 µg/mL, 62.5 µg/mL and 31.3 µg/mL. The blank is a blank medium. *$p<0.05$, $p<0.01$, $p<0.001$.
Figure 11:
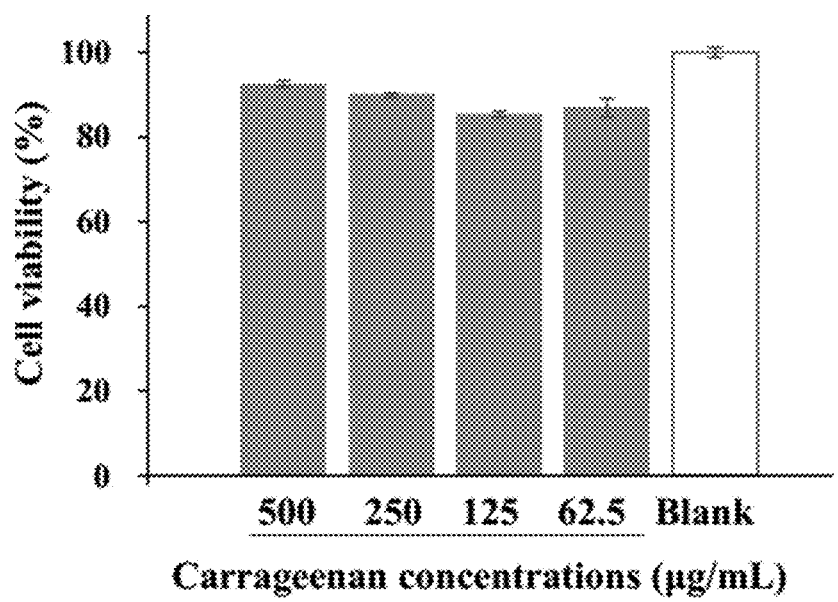
FIG. 11 shows the influence of carrageenan on the viability of Vero E6 cells. The final concentrations of carrageenan are 500 µg/mL, 250 µg/mL, 125 µg/mL, 62.5 µg/mL and 31.3 µg/mL. The blank is a blank medium. *$p<0.05$, $p<0.01$, $p<0.001$.

The SARS-CoV-2 live virus (the SARS-CoV-2 live virus was from Second Military Medical University) and the t-carrageenan were uniformly mixed with a DMEM medium containing 5% fetal calf serum. The mixture was allowed to stand at 37° C. for 1 h, added to a 96-well plate inoculated with Vero E6 cells 12 h in advance (the original cell culture fluid was blotted before the addition), and cultured for 24 h. Then, the viral protein was detected using immunofluorescence. DAPI was used to stain the nucleus. The inhibitory effect of the carrageenan with the concentrations of 500 µg/mL, 250 µg/mL, 125 µg/mL, 62.5 µg/mL and 31.3 µg/mL on the virus was observed using immunofluorescence microscopy. The results are shown in FIG. 9. Statistics were made using SPSS software Tukey HSD, as shown in FIG. 10. Within the concentration range of 62.5-500 µg/mL, the carrageenan could significantly inhibit the novel coronavirus from infecting the cells. Meanwhile, statistics on the quantitative results of the nucleus (blue fluorescence) were also made using the SPSS software Tukey HSD, as shown in FIG. 11. At the concentration of 62.5-500 µg/mL, the carrageenan showed no cytotoxicity.

Example 8 Preparation Method of Sea Cucumber Polysaccharide Nasal Spray

In a sterile environment, 40 g of sodium chloride, 100 g of citric acid, 100 g of sodium citrate and 1 g of benzalkonium chloride were respectively dissolved in 10 times the amount of purified water by stirring. 10 g of sea cucumber polysaccharide was dissolved in 500 mL of purified water by stirring. The above solutions were combined and diluted with purified water to 10 L, the mixture was filtered through a 0.5-micron filter membrane, and the filtrate was canned.

Example 9 Preparation Method of Sea Cucumber Polysaccharide Hand Lotion

The formulation of the hand lotion is shown in Table 2 below:

TABLE 2

| Ingredient Oil phase | Part(s) | Ingredient Water phase | Part(s) |
|---|---|---|---|
| Stearic acid | 5 | Glycerin | 6 |
| Glycerol monostearate | 2 | Allantoin | 0.3 |
| Isopropyl palmitate | 3 | Dimethyl p-chlorophenol | 0.1 |
| Petrolatum | 2 | Triethanolamine | 0.7 |
| White mineral oil | 8 | Sea cucumber polysaccharide | 0.1 |
| Cetyl alcohol | 2 | Water | 70.4 |
| Fragrance | 0.3 | | |
| Methyl paraben | 0.2 | | |
| Propyl paraben | 0.1 | | |

The oil phase (stearic acid, glycerol monostearate, isopropyl palmitate, petrolatum, white mineral oil, cetyl alcohol, methyl paraben and propyl paraben) was dissolved by heating and stirring. The sea cucumber polysaccharide was dissolved in water, and the glycerin and the triethanolamine were added and dissolved by heating and stirring; then the water phase was slowly poured into the oil phase with vigorous stirring. After the mixture was treated with a homogenizer, heating and stirring were started, the allantoin, the dimethyl p-chlorophenol and the fragrance were added when the mixture was cooled to 50° C., the stirring was continued, and the product was discharged when being cooled to 30° C. The product was placed for 2-3 days after which no changes occurred, and was packaged after passing the inspection.

Example 10 Preparation Method of Sea Cucumber Polysaccharide Oral Liquid 1.6 kg of wolfberry and 1.6 kg of longan were boiled in 16 L of water and held with low fire for 1 h, the mixture was filtered, the filtrate was taken and concentrated to 12 L, 60 g of sea cucumber polysaccharide, 12 g of pectin and 840 g of honey were added, and the mixture was stirred uniformly, naturally cooled and allowed to stand for 3 h to make the precipitation complete. The filtrate was taken by pressure filtration, 910 g of white sugar, 52 g of citric acid, 6.5 g of table salt and 26 g of vitamin C were added and mixed uniformly, pressure filtration was carried out with diatomite, filtration was carried out through two stages of microporous filter membranes with pore sizes of 5 microns and 0.5 micron, and the filtrate was pasteurized (80° C., 30 min) and canned.

Example 11 Preparation Method of *A. Nodosum* Fucoidan Nasal Spray

In a sterile environment, 40 g of sodium chloride, 100 g of citric acid, 100 g of sodium citrate and 1 g of benzalkonium chloride were respectively dissolved in 10 times the amount of purified water by stirring. 10 g of *A. nodosum* fucoidan was dissolved in 500 mL of purified water by stirring. The above solutions were combined and diluted with purified water to 10 L, the mixture was filtered through a 0.5-micron filter membrane, and the filtrate was canned.

Example 12 Preparation Method of *A. Nodosum* Fucoidan Hand Lotion

The formulation of the hand lotion is shown in Table 3 below:

TABLE 3

| Ingredient Oil phase | Part(s) | Ingredient Water phase | Part(s) |
|---|---|---|---|
| Stearic acid | 5 | Glycerin | 6 |
| Glycerol monostearate | 2 | Allantoin | 0.3 |
| Isopropyl palmitate | 3 | Dimethyl p-chlorophenol | 0.1 |
| Petrolatum | 2 | Triethanolamine | 0.7 |

TABLE 3-continued

| Ingredient Oil phase | Part(s) | Ingredient Water phase | Part(s) |
|---|---|---|---|
| White mineral oil | 8 | A. nodosum fucoidan | 0.1 |
| Cetyl alcohol | 2 | Water | 70.4 |
| Fragrance | 0.3 | | |
| Methyl paraben | 0.2 | | |
| Propyl paraben | 0.1 | | |

The oil phase (stearic acid, glycerol monostearate, isopropyl palmitate, petrolatum, white mineral oil, cetyl alcohol, methyl paraben and propyl paraben) was dissolved by heating and stirring. The A. nodosum fucoidan was dissolved in water, and the glycerin and the triethanolamine were added and dissolved by heating and stirring; then the water phase was slowly poured into the oil phase with vigorous stirring. After the mixture was treated with a homogenizer, heating and stirring were started, the allantoin, the dimethyl p-chlorophenol and the fragrance were added when the mixture was cooled to 50° C., the stirring was continued, and the product was discharged when being cooled to 30° C. The product was placed for 2-3 days after which no changes occurred, and was packaged after passing the inspection.

Example 13 Preparation Method of A. Nodosum Fucoidan Oral Liquid 1.6 kg of wolfberry and 1.6 kg of longan were boiled in 16 L of water and held with low fire for 1 h, the mixture was filtered, the filtrate was taken and concentrated to 12 L, 60 g of A. nodosum fucoidan, 12 g of pectin and 840 g of honey were added, and the mixture was stirred uniformly, naturally cooled and allowed to stand for 3 h to make the precipitation complete. The filtrate was taken by pressure filtration, 910 g of white sugar, 52 g of citric acid, 6.5 g of table salt and 26 g of vitamin C were added and mixed uniformly, pressure filtration was carried out with diatomite, filtration was carried out through two stages of microporous filter membranes with pore sizes of 5 microns and 0.5 micron, and the filtrate was pasteurized (80° C., 30 min) and canned.

Example 14 Preparation Method of Carrageenan Nasal Spray

In a sterile environment, 40 g of sodium chloride, 100 g of citric acid, 100 g of sodium citrate and 1 g of benzalkonium chloride were respectively dissolved in 10 times the amount of purified water by stirring. 10 g of carrageenan was dissolved in 500 mL of purified water by stirring. The above solutions were combined and diluted with purified water to 10 L, the mixture was filtered through a 0.5-micron filter membrane, and the filtrate was canned.

Example 15 Preparation Method of Carrageenan Respirator Filter Cartridge 2 g of PVA, 10 g of PET, 40 mg of xylometazoline hydrochloride and 0.5 mg of NaCl were added to 100 mL of a carrageenan aqueous solution with a concentration of 0.01 g/mL, and the mixture was stirred in a 90° C. water bath for 30 min. The obtained viscous solution was spun on a nonwoven fabric by electrospinning to prepare a carrageenan film used as the carrageenan respirator filter cartridge. Under the conditions of a working voltage of 15 kV, a working time for electrospinning of 3 h and blowing distance of 25 cm, the carrageenan respirator filter cartridge was obtained.

Example 16 Preparation Method of Carrageenan Wash-Free Hand Sanitizer

The formulation included: 50% of 75% ethanol, 2% of glycerin, 4% of hydroxyethyl cellulose, 0.05% of sodium citrate, 1% of lauroyl diethanolamide, 8% of vitamin E, 2% of citrus oil and the balance of 0.005 g/mL carrageenan aqueous solution. The hydroxyethyl cellulose and the sodium citrate were dissolved in the carrageenan aqueous solution to obtain a water-soluble component. The glycerin, the lauroyl diethanolamide, the vitamin E and the citrus oil were dissolved in 75% ethanol to obtain an oil-soluble component. The water-soluble component and the oil-soluble component were mixed and stirred uniformly, the mixture was filtered through a 1-micron filter membrane, and the filtrate was canned.

What is claimed is:

1. A method of inhibiting a novel coronavirus SARS-COV-2 infection in a subject in need thereof, comprising:
   providing sea cucumber polysaccharides to the subject, thereby binding of the sea cucumber polysaccharides to an S protein on the surface of SARS-COV-2 of the subject to prevent the SARS-COV-2 virus from invading body cells, wherein the sea cucumber polysaccharides comprise sea cucumber sulfated fucan and sea cucumber fucosylated chondroitin sulfate.

2. The method according to claim 1, wherein the sea cucumber polysaccharides are produced by the following steps:
   cleaning, boiling, draining, dicing and freeze-drying sea cucumbers to produce a freeze dried sea cucumber,
   soaking the freeze dried sea cucumber in acetone at 4° C. for 24 hours,
   air-drying the freeze dried sea cucumber at room temperature,
   obtaining a mixture by adding to 1 gram of the freeze dried sea cucumber: 30 mL of 0.1 mol/L sodium acetate buffer solution at pH 6.0, 100 mg of papain with specific enzyme activity of 2 units/mg, 48 mg of ethylenedinitrilotetraacetic acid, and 18 mg of cysteine,
   vortex-mixing the mixture,
   shaking the mixture in a 60° C. water bath for 24 hours to produce a first reaction mixture,
   centrifuging the first reaction mixture,
   removing a supernatant from the first reaction mixture,
   adding 1.6 mL of 10% cetylpyridinium chloride solution to the supernatant, to produce a second reaction mixture,
   allowing the second reaction mixture to stand at room temperature for 24 hours,
   centrifuging the second reaction mixture,
   removing a first precipitate from the second reaction mixture,
   dissolving the first precipitate in 15 mL of 3 mol/L NaCl-ethanol solution to produce a first precipitate solution,
   adding 30 mL of a 95% ethanol solution to the first precipitate solution to produce a precipitate ethanol mixture,
   allowing the precipitate ethanol mixture to stand at 4° C. for 24 hours,
   centrifuging the precipitate ethanol mixture, removing a second precipitate from the centrifuged precipitate ethanol mixture, washing the second precipitate with 80% ethanol 2 to 3 times, washing the second precipitate with 95% ethanol 2 to 3 times, air-drying the second precipitate at room temperature, dissolving the second precipitate in distilled water to produce a second precipitate solution, desalting the second precipitate solution with a dialysis bag to produce a product, and freeze-drying the product to obtain the sea cucumber polysaccharides.

3. The method of claim 1, wherein the sea cucumber polysaccharides are from sea cucumbers selected from one or more of *Aspidochirotida: Holothuriidae, Aspidochirotida: Stichopodidae, Molpadida: Caudinidae,* and *Dendrochirotida: Cucumariidae.*

4. The method of claim 1, wherein the sulfated fucan has a molecular weight of less than 670 kDa, and wherein the fucosylated chondroitin sulfate has a molecular weight of 179 kDa.

5. The method of claim 1, wherein the sea cucumber polysaccharides comprise glucosamine (GlcN), galactosamine (GalN), glucose (Glc), galactose (Gal), and fucose (Fuc), in a mole ratio of 1.0:1.7:1.1:1.8:16.0.

6. The method of claim 1, wherein the sea cucumber polysaccharides comprise uronic acid at a concentration of 16.5±0.5%.

* * * * *